United States Patent [19]
Leitner

[11] Patent Number: 5,632,362
[45] Date of Patent: May 27, 1997

[54] BICYCLE DISC BRAKE

[75] Inventor: Horst Leitner, Laguna Beach, Calif.

[73] Assignee: RockShox, Inc., San Jose, Calif.

[21] Appl. No.: 515,712

[22] Filed: Aug. 15, 1995

[51] Int. Cl.[6] .................. B62L 3/06; B62L 1/10; B60T 11/14
[52] U.S. Cl. .......... 188/344; 188/18 A; 188/26; 188/2 D; 188/24.22; 188/72.6; 188/73.2; 188/218 XL
[58] Field of Search ............... 188/344, 72.6, 188/106 F, 24.22, 2 D, 26, 18 A, 73.43, 72.4, 73.44, 72.5, 106 P, 73.2, 218 XL, 73.45; 60/594, 592; 303/9.64

[56] References Cited

U.S. PATENT DOCUMENTS

| 2,189,904 | 2/1940 | Insko | 188/344 |
|---|---|---|---|
| 2,871,662 | 2/1959 | Nagel et al. . | |
| 2,911,004 | 11/1959 | Whitten . | |
| 2,952,128 | 9/1960 | Highland . | |
| 3,718,373 | 2/1973 | Hofer . | |
| 4,084,377 | 4/1978 | Gaiser . | |
| 4,176,886 | 12/1979 | Watanabe | 188/344 |
| 4,257,496 | 3/1981 | Fujita et al. | 188/344 |
| 4,456,310 | 6/1984 | Hayashi et al. | 188/344 |
| 4,494,800 | 1/1985 | Hayashi | 188/344 |
| 4,703,839 | 11/1987 | Nakano et al. | 188/344 |
| 4,716,993 | 1/1988 | Bass | 188/26 |
| 4,842,102 | 6/1989 | Tateyama | 188/26 |
| 5,078,456 | 1/1992 | Cox | 303/89 |
| 5,082,093 | 1/1992 | Sule . | |
| 5,190,124 | 3/1993 | Haneda . | |
| 5,193,833 | 3/1993 | Reisinger . | |
| 5,259,483 | 11/1993 | Pelfrey | 188/344 |
| 5,390,771 | 2/1995 | Hinkens et al. . | |
| 5,462,137 | 10/1995 | Aubry et al. | 188/72.6 |

Primary Examiner—Douglas C. Butler
Attorney, Agent, or Firm—Knobbe, Martens, Olson An Bear, LLP

[57] ABSTRACT

A disc braking assembly provides a compact, lightweight braking arrangement which utilizes hydraulic fluid to provide greater braking power. Durability and reliability are achieved by use of a compensating chamber and piston having a compensating piston biasing member.

22 Claims, 15 Drawing Sheets

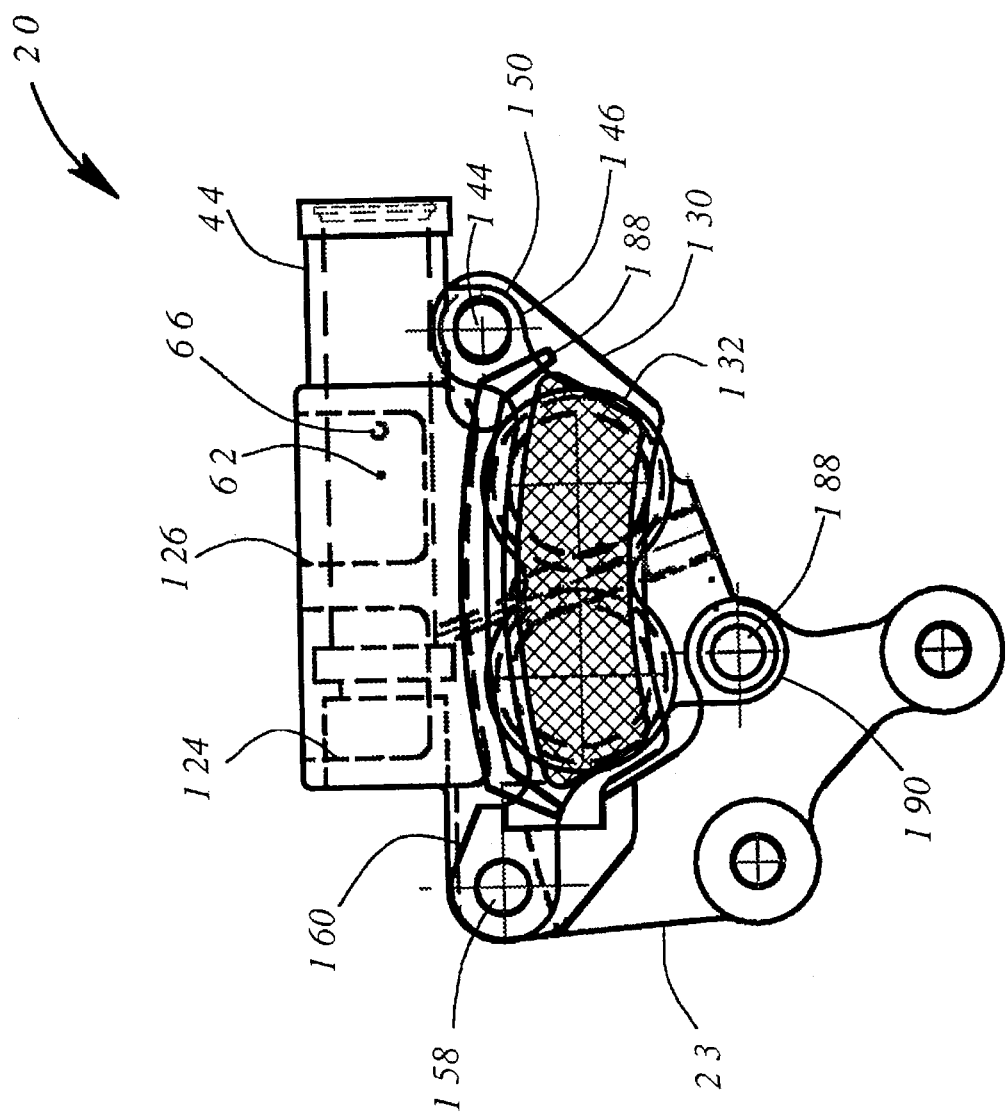

BICYCLE DISC BRAKE

FIELD OF THE INVENTION

This invention relates to bicycle brakes and, in particular, to bicycle disc brakes.

BACKGROUND OF THE INVENTION

The riding of bicycles over rough or mountainous terrain has grown increasingly popular over the years. The environment in which these bicycles, known as "mountain bikes," are ridden creates numerous demands on the equipment. Because the rider must propel not only his or her own weight, but also the weight of the mountain bike, a high premium is put on minimizing weight. On the other hand, due to the tremendous forces exerted on the mountain bikes during use, and the ramifications of breakage or a system failure (stranding the rider or rider injury), a high priority is placed both on durability and reliability. Furthermore, because these bikes are often ridden in undeveloped areas, it is important that almost any failure of the bike be able to be repaired by the cyclist with only the simplest of tools and a minimum of components.

For purposes of rider safety, no aspect of the mountain bike is more important than the brake assembly. In a downhill run, the brakes are applied almost continuously with varying levels of braking force. If too much brake force is applied, the rider may be thrown from the bicycle. If too little brake force is applied, the rider may lose control of the bicycle and crash. Unfortunately, due to near continuous braking in downhill situations, brake pad wear requires that brakes be adjusted often to maintain a given amount of brake handle travel for a given level of braking force.

Disc brake systems are generally recognized as having the capability of generating greater braking force than standard caliper brakes systems and various disc brake systems are available for bicycles. These systems, however, have not gained widespread acceptance. A significant problem with prior art bicycle disc brake systems is inconsistency in the requirements for generating a given kind of braking force. Specifically, in addition to the impact of brake pad wear found in standard brake systems, heat generated by braking can easily result in hydraulic fluid volume changes of 10% or more. Thus, changes in brake assembly temperatures during a single run can result in significant changes in brake handle travel for a given level of braking force. This makes the bicycle difficult to control, particularly when the cyclist pushes the envelope of his or her capabilities.

Accordingly, there is needed an improved bicycle disc brake system which is both durable, reliable, of low weight and provides for a consistent feedback for a given amount of braking force on the wheels.

SUMMARY OF THE INVENTION

Applicant's invention is a disc brake assembly for a bicycle which lends itself to lightweight, durable, reliable construction, while providing consistent feedback to the cyclist for a given amount of brake force on the wheels. Advantageously, this consistent feedback can be achieved without the risk of air bubble formation and associated brake system failure.

One aspect of the invention is an improved disc brake assembly for a bicycle, including a master housing defining a master chamber adapted to be mounted on the fork of a bicycle. A reservoir housing defines a reservoir chamber within which a compensating body or piston is mounted so that the compensating piston and reservoir chamber cooperate to form a compensating chamber. A compensating body biasing member biases the compensating body toward one end of the compensating chamber. A first compensating channel defines a first compensating flow path connecting the master chamber and the compensating chamber.

A master piston shaft is mounted at least partially within the master chamber and a master piston is mounted on the master piston shaft. The master piston shaft defines a primary chamber between the master piston and a first end of the master chamber. The assembly further includes a seal between the master piston shaft and the master chamber distal the master piston from the first end of the master chamber at least partially defining a secondary chamber between the master piston and the second end of the master chamber.

A brake channel defines a brake flow path connecting the primary chamber with a brake piston chamber formed by a brake piston housing. A brake piston is reciprocally mounted within the brake piston chamber. The master piston shaft is movable from a braking position wherein the first flow path is in communication with the secondary chamber and a release position wherein the first flow path is in communication with the primary chamber.

Desirably, the compensating body biasing member has a spring constant of between 2–4 pounds per square inch and, desirably, a spring constant of roughly 3 pounds per square inch. This relatively low spring contrast provides for a greater degree of spring travel to compensate for brake pad wear. Advantageously, the assembly includes hydraulic fluid in the compensating chamber's channels, and the compensating body biasing member exerts sufficient force on the compensating body that the compensating body exerts at least 0.3 pounds per square inch on the hydraulic fluid. This has been found to be sufficient pressure to prevent the formation of air bubbles when the bicycle is inverted. To avoid the formation of air bubbles during vibration, the force exerted is desirably at least 0.5 pounds per square inch and, most preferably, approximately 0.6 pounds per square inch. Furthermore, to ensure that the brake mechanism fully releases, it is desirable that the compensating body not exert a force on the hydraulic fluid of greater than 3 pounds per square inch. The assembly may further include a disc adapted to be fixed to a wheel, a first brake pad and a second brake pad with the first and second brake pads straddling the disk.

In a preferred embodiment of the invention, the seal comprises a secondary piston connected to the master piston shaft and a second compensating channel defines a second compensating flow path connecting the master chamber and the compensating chamber. The assembly desirably includes a guide rod connected to one of the housings and a mounting bracket slidably receiving the guide rod adapted to be fixed relative to a bicycle fork. To maintain the compactness of the system, the master piston is desirably coaxially connected to a cable.

Importantly, the disc brake assembly compensates for varying volumes of hydraulic fluid in the system to provide a constant feel for a given level of braking force exerted on the wheel. Another important aspect of the invention is that the assembly permits the elimination of air bubbles in the system, thereby preventing brake system failure.

Another aspect of the invention is a disc brake assembly for a bicycle, particularly adapted to be manufactured in a light and compact manner. The assembly includes a master housing defining a master chamber having a first end and a second end, with the master housing being adapted to be mounted on the fork of a bicycle. The assembly includes a reservoir housing defining a compensating chamber and a first compensating channel connecting the master chamber and the compensating chamber. A second compensating channel connects the master chamber and the compensating chamber. A master piston shaft is mounted at least partially within the master chamber and a master piston and a secondary piston are mounted on the master piston shaft. A primary chamber is defined between the master piston and the first end of the master chamber and a secondary chamber is defined between the master piston and the secondary piston.

A master piston shaft biasing member is mounted within an associated housing and biases the master piston shaft from a braking position wherein the first channel and the second channel are in communication with the secondary chamber toward a release position wherein the first channel is in communication with the primary chamber and the second channel is in communication with the secondary chamber. A cable extends through an internal path defined by the master piston shaft and is connected at one end to an actuator handle and at the other end to a stop connected to the cable distal the master piston from the secondary piston. The primary chamber is connected to a brake piston chamber by a brake channel, and a brake piston is reciprocally mounted within the brake piston chamber. This structural configuration minimizes the number of levers to actuate the brake mechanism and minimizes maintenance problems by eliminating pivot points exposed to the environment.

Desirably, the assembly further comprises a guide rod connected to one of the housings, and a mounting bracket slidably receiving the guide rod adapted to be fixed relative to a bicycle fork. Advantageously, the assembly also includes a first and second brake pad mounted on one of the housings adapted to straddle a disc mounted on a wheel. In a preferred embodiment, the housings of the assembly comprise an integrally formed one-piece unit.

BRIEF DESCRIPTION OF THE DRAWINGS

FIG. 6a is an elevational view of the outer side of portion disc brake assembly with compensating, master and braking piston chambers shown in phantom;

DETAILED DESCRIPTION OF THE PREFERRED EMBODIMENT

Figure 1:
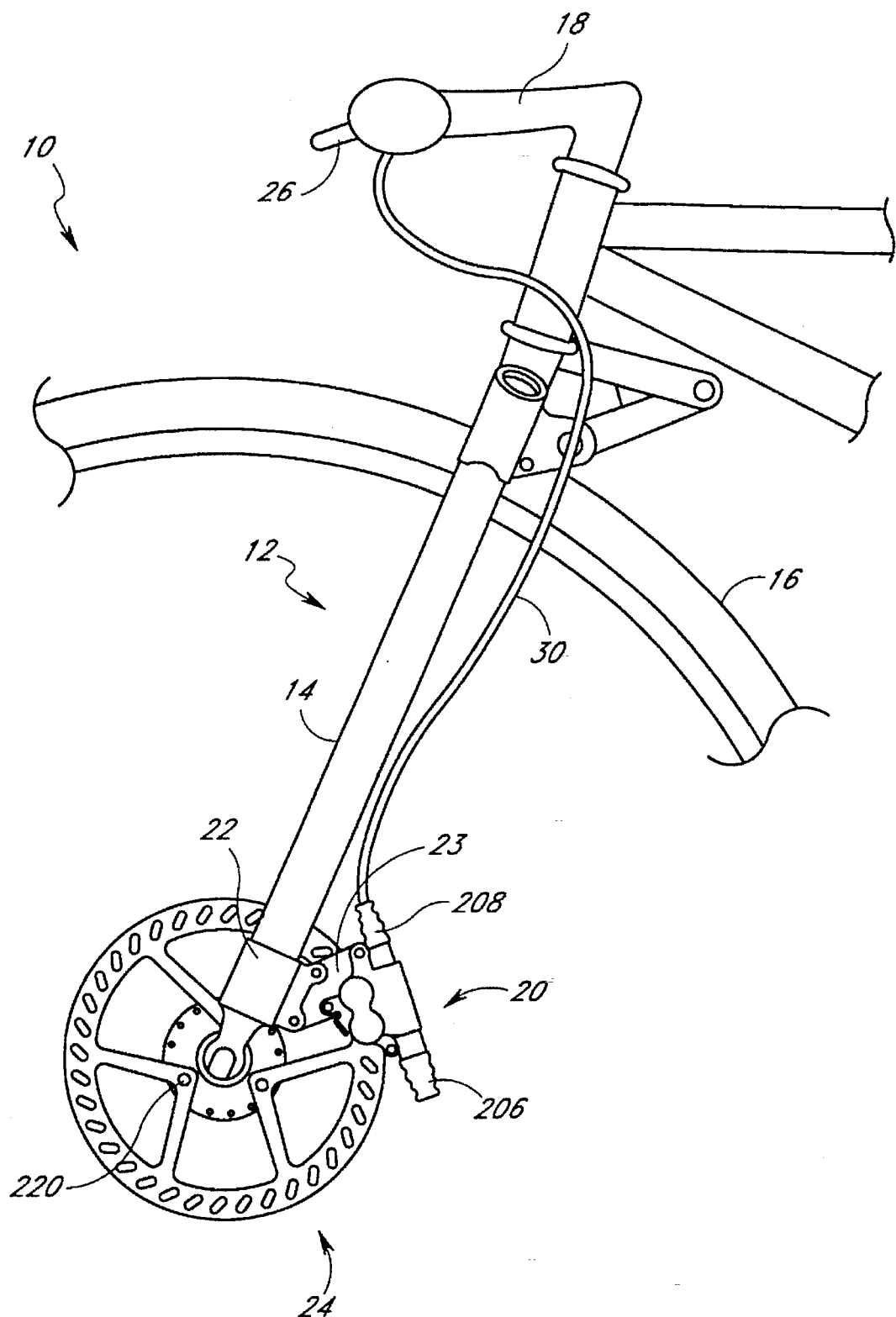
FIG. 1 is a side elevational view of a bicycle utilizing a preferred embodiment of a disc brake assembly of the present invention mounted on the front fork.
Figure 2:
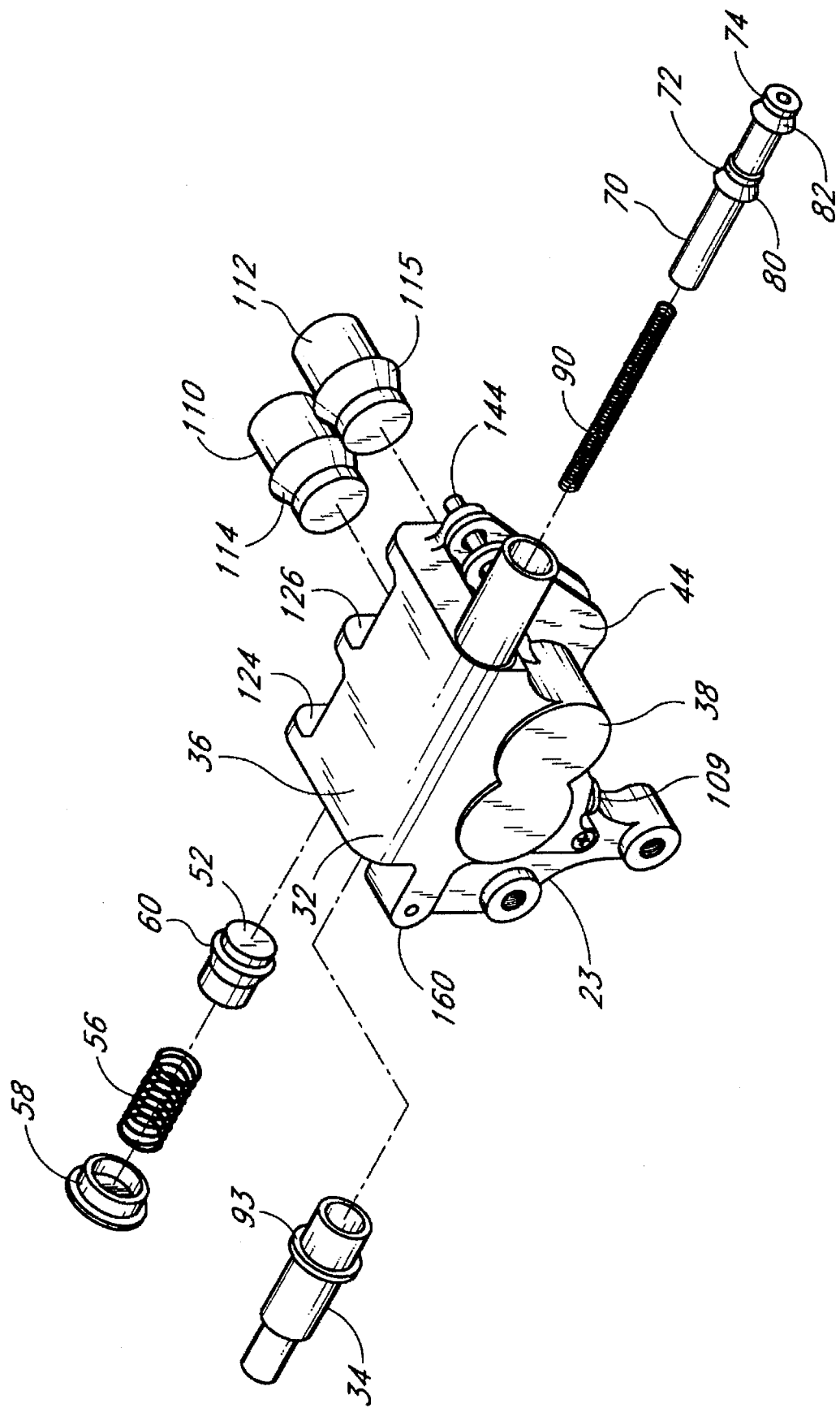
FIG. 2 is an exploded perspective view of a portion of the disc brake assembly of the present invention.

The disc brake assembly of the present invention will now be described with reference to the figures. Referring now to FIG. 1, a bicycle 10 (of which only the front portion is shown) includes a front fork 12 having a pair of arms 14 which straddle a wheel 16 and which are connected to a pair of handle bars 18. A main unit 20 of the disc brake assembly is mounted proximate the lower end of one of the pair of arms 14 by means of a clamp 22 and a mounting bracket 23. A disc 24 is mounted on the wheel 16 so that the main unit 20 straddles the disc. An actuator 26 for the brake assembly is mounted on the handle bars 18 and is connected to the main unit by means of a cable 28 (FIG. 3) which is surrounded by a sheath 30.

Referring now to FIGS. 2–10, the main unit 20 will now be described in detail. The main unit 20 includes a master cylinder or housing 32, a master piston shaft biasing member receptacle 34, a reservoir housing 36 and a brake piston housing 38. Advantageously, the unique structural configuration of the main unit permits the housings to be formed as an integral one-piece unit, minimizing size and weight, while maximizing durability and reliability. For ease of manufacture, the master piston shaft biasing member receptacle 34 comprises a separate piece.

The master housing 32 defines a master chamber 40 including a first or proximal end 42 and a second or distal end 44. As used herein, proximal is used to describe closer to the actuator 26 (generally along the cable 28) and distal is used to describe farther from the actuator 26 (generally along the cable 28). Similarly, the reservoir housing 36 defines a reservoir chamber 46 having a first end 48 and a second end 50.

A compensating piston 52 is mounted within the reservoir chamber 46 and cooperates with the reservoir chamber 46 to define a compensating chamber 54 between the compensating piston 52 and the second end 50 of the reservoir chamber 46. A compensating piston biasing member 56, such as a helical spring or other suitable device, is positioned between the compensating piston 52 and a compensating piston biasing member cap 58 secured proximate the first end 48 of the reservoir chamber 46. Where the compensating piston biasing member 56 is a helical spring, it desirably has a spring constant of three pounds per square inch and is preloaded one inch. As with the master piston shaft biasing member receptacle 34, the cap 58 is desirably a separate piece for purposes of ease of manufacture. A compensating chamber seal 60 is provided between the compensating piston biasing member 56 and the compensating chamber 54. The compensating piston biasing member cap 58 may be secured using a screw (not shown) secured within a threaded bore (not shown) in the reservoir housing 36 so that the screw's head overlaps the second end 48 of the reservoir chamber 46 and a lip 61 of the compensating piston biasing member cap 58. Although the above structure is preferred, instead of a piston and helical spring, an accordion-style diaphragm and other form of biasing member could also be used.

A first compensating channel 62 defines a first compensating channel flow path 64 between the compensating chamber 54 and the master chamber 40. A second compensating channel 66 defines a second compensating channel flow path 68 which likewise connects the compensating chamber 54 with the master chamber 40. In the preferred embodiment, both the first compensating channel 62 and the second compensating channel 66 are located proximate the second end 50 of the compensating chamber 54, with the first compensating channel 62 being located closer to the first end 48 of the reservoir chamber 46 and the second compensating channel 66 being located closer to the second end 50 of the reservoir chamber 46.

A master piston shaft 70 is mounted within the master chamber 40 so as to extend coaxially between the first end 42 and the second end 44 of the master chamber 40. A master piston 72 and a secondary piston 74 are mounted on the master piston shaft 70. The secondary piston 74 is mounted to the distal end of the master piston shaft 70 and the master piston 72 is mounted on the master piston shaft 70 a distance from the secondary piston 74. The master piston defines a primary chamber 76 between the master piston 72 and the first end 42 of the master chamber 40. The secondary piston 74 at least partially defines a secondary chamber 78 between the master piston 72 and the secondary piston 74.

A primary seal 80, such as an O-ring or U-cup seal, prevents fluid flow between the walls of the master housing 32 forming the master chamber 40 and the master piston 72. Likewise, a secondary seal, such as an O-ring 82 prevents the flow of fluid between the walls of the master housing 32 forming the master chamber 40 and the secondary piston 74. Preferably, the master piston shaft 70 includes first and second seats proximate the master and secondary pistons 72 and 74, respectively, to receive the primary and secondary seals 80 and 82.

The master piston shaft biasing member receptacle 34 is located on the proximate side of the master housing 32 proximate the first end 42 of the master chamber 40. The master piston shaft biasing member receptacle 34 has a first or proximal end 86 and a second or distal end 88. A master piston shaft biasing member 90 is positioned between the first end 86 of the master piston shaft biasing member receptacle 34 and an inner annular shoulder 91 of the master piston shaft 70. The inner shoulder 91 is located at approximately the position of the outer primary seal 80. The master piston shaft biasing member receptacle 34 additionally defines a cup-shaped opening or sheath holder 92 which receives and retains a collar 94 surrounding the distal end of the sheath 30. Preferably, the distal end 88 of the master piston shaft biasing member receptacle 34 is inserted into the proximal end 40 of the master housing 32 after positioning therein of the master piston shaft biasing member 90. The master piston shaft biasing member receptacle 34 is then secured by a screw (not shown) within a tapped bore (not shown) so that its head overlaps an outer annular shoulder or stop ring 93 proximate the distal end 88.

A master seal 96 is positioned between the second end 88 of the master piston shaft biasing member receptacle 34 and the first end 42 of the master chamber 72 so as to surround the master piston shaft 70 and prevent the flow of fluid between the master chamber 40 and the master piston shaft biasing member receptacle 34.

Figure 3:
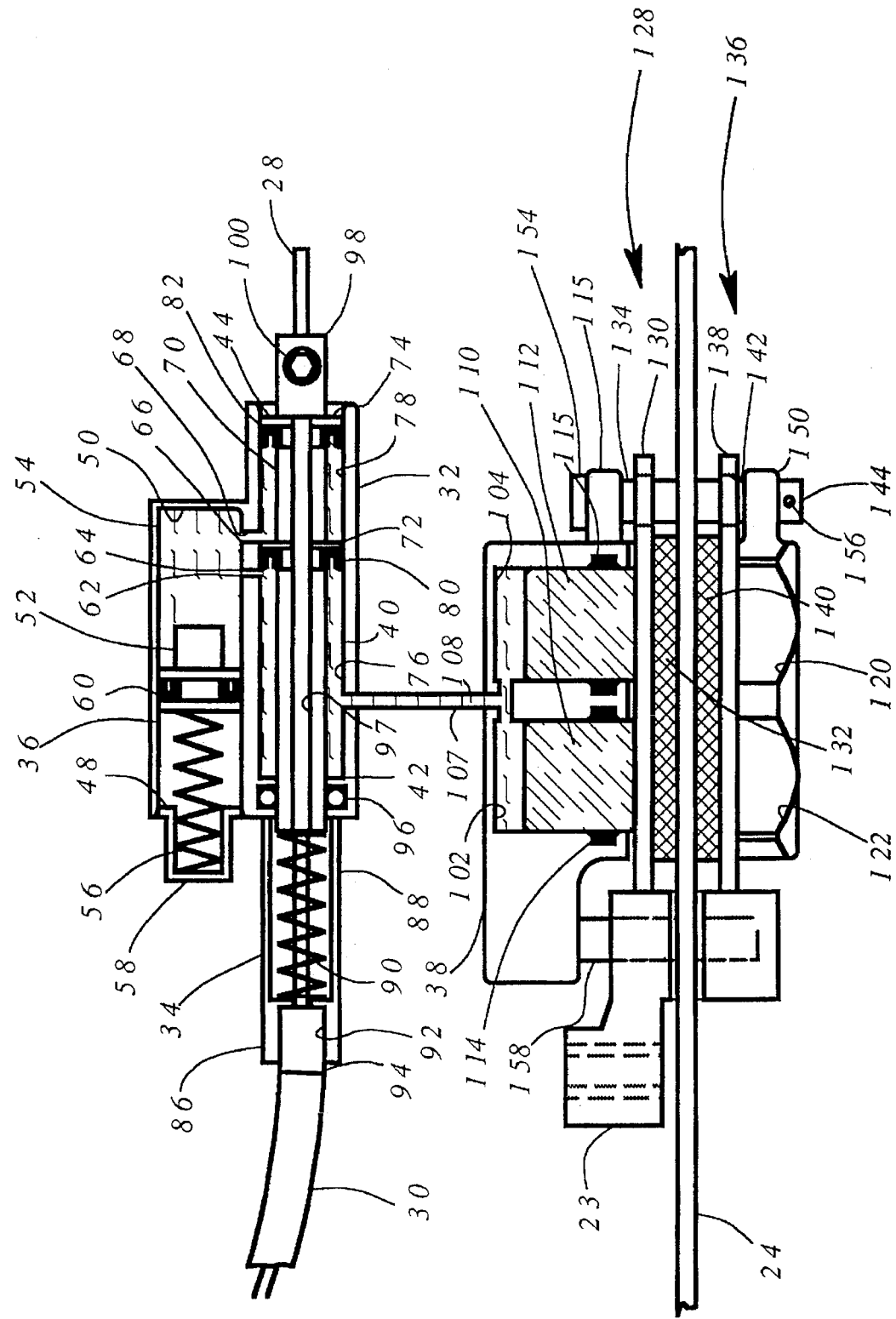
FIG. 3 is a schematic view of the disc brake assembly of the present invention.
Figure 4:
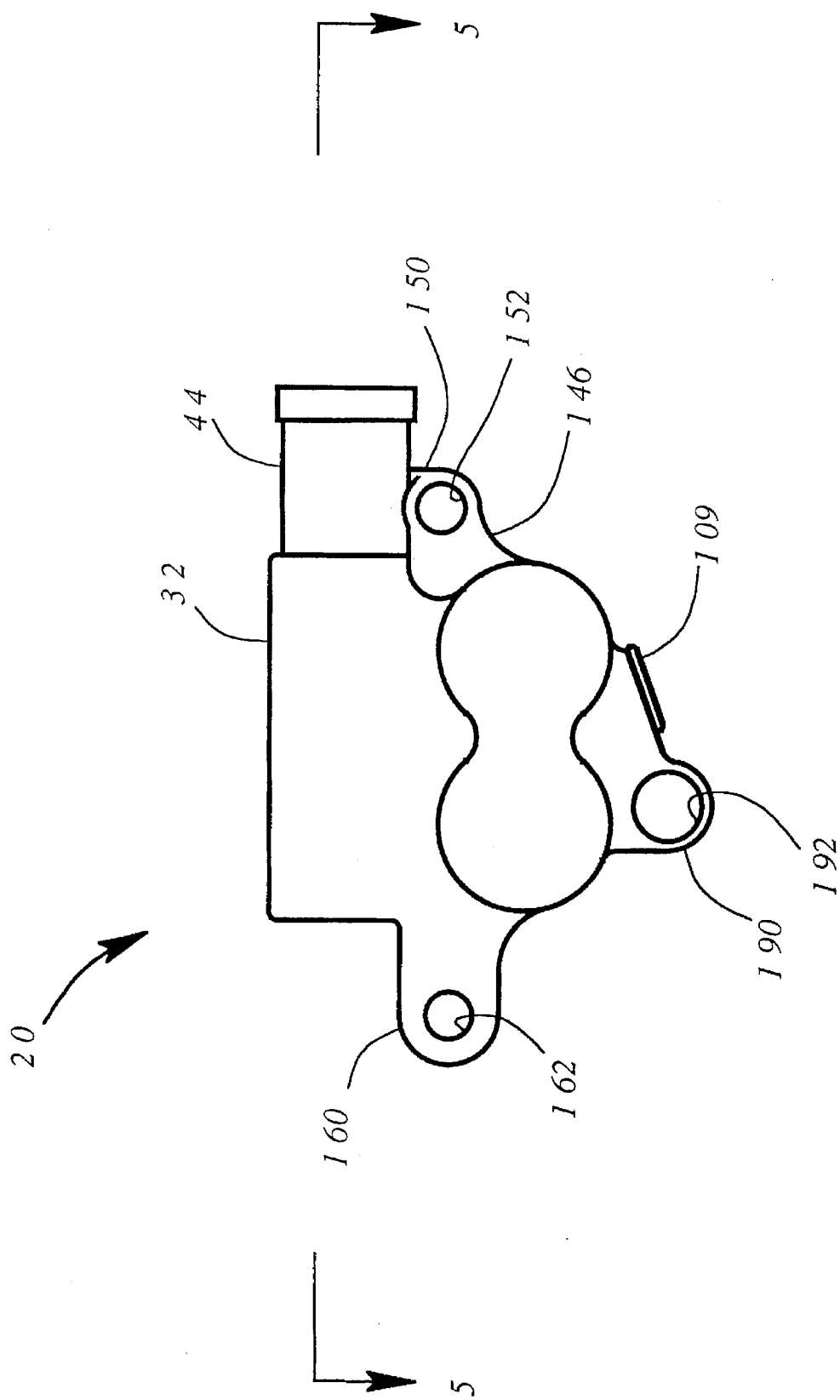
FIG. 4 is an elevational view of the outer side of a main unit of the disc brake assembly of FIG. 2.

Referring to FIG. 3, the cable 28 extends through the collar 94 at the distal end of the sheath 30 secured within the sheath holder 92, through the master piston shaft biasing member receptacle 34 and through a coaxial internal path 97 in the master piston shaft 70 through the distal end of the master piston shaft 70 and extends through a stop 98 to which the cable 28 is secured by means of a locking bolt 100.

The brake piston housing 38 will now be described. The brake piston housing 38 defines a cylindrical first brake piston chamber 102 and a cylindrical second brake piston chamber 104.

Figure 7:
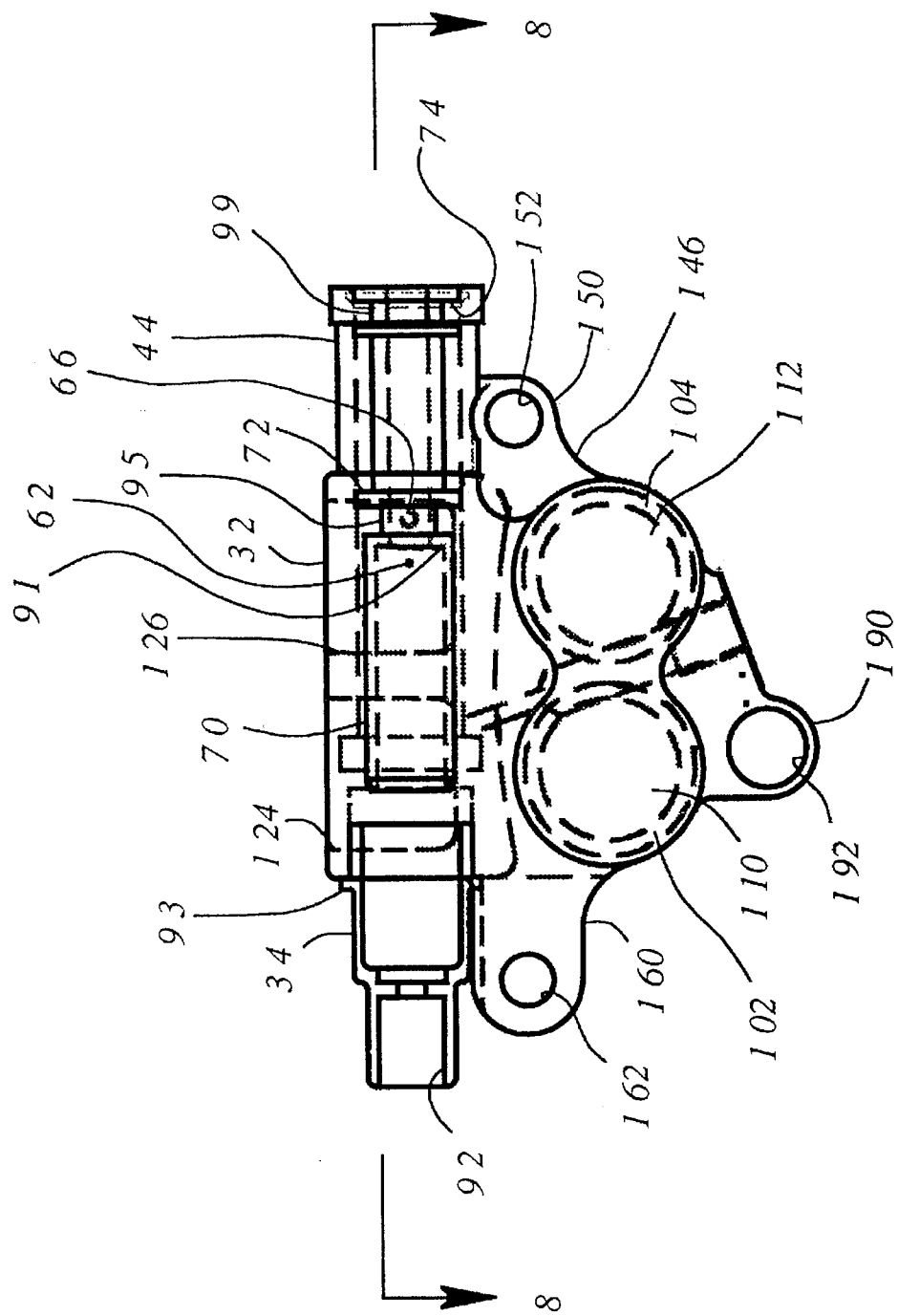
FIG. 7 is an elevational view of the main unit with the compensating, master and braking piston chambers shown in phantom.
Figure 8:
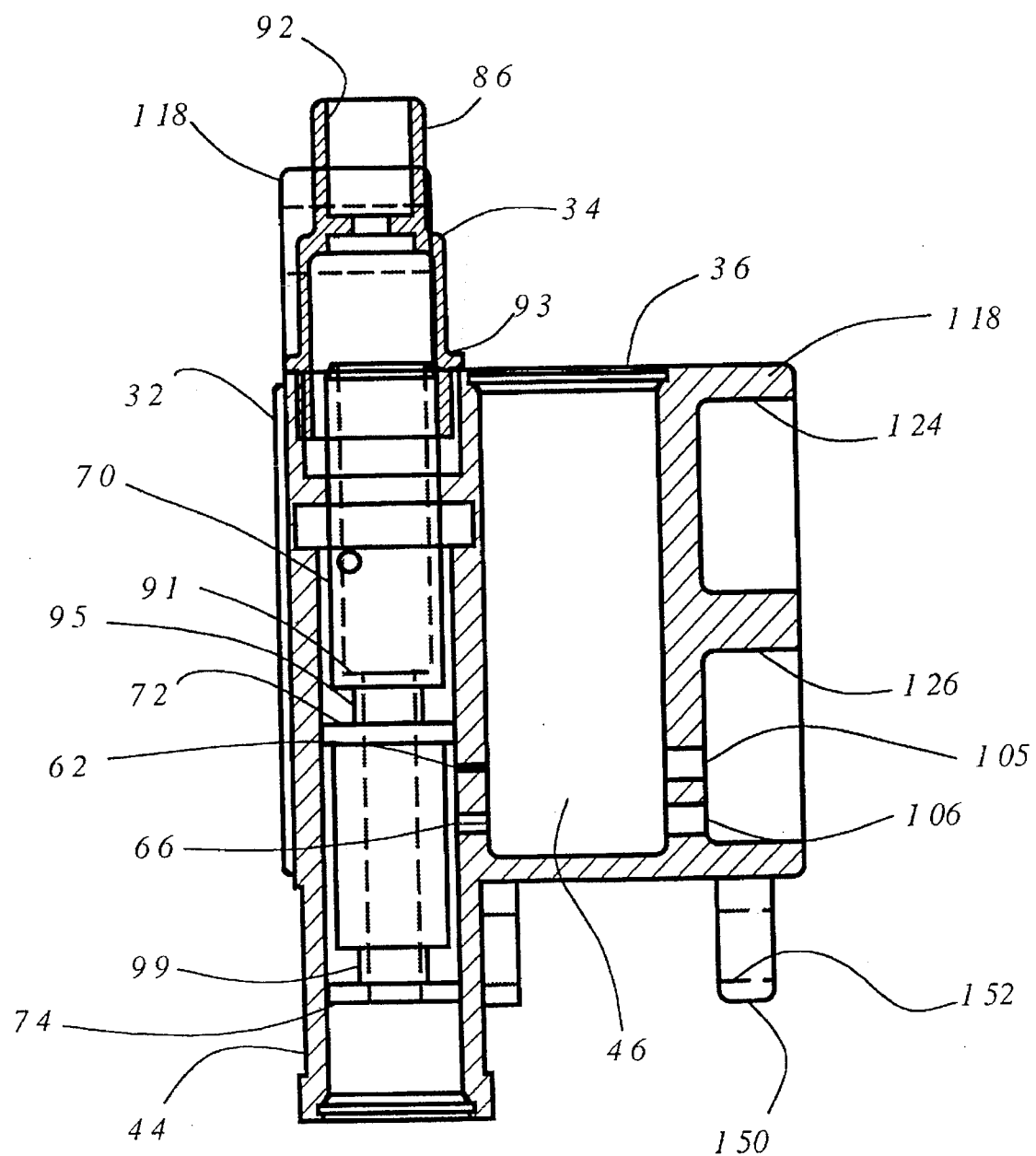
FIG. 8 is a partial cut-away view of the main unit taken along lines 8—8 of FIG. 7.

As illustrated in FIG. 7, a brake channel 107 defines a brake flow path 108 connecting the primary chamber 76 with the first brake piston chamber 102 and the second brake piston chamber 104. A screw 109 is inserted into the end of the brake channel 107 opposite the primary chamber 76 to prevent the leakage of hydraulic fluid from the main unit 20.

A first brake piston 110 is reciprocally mounted within the first brake piston chamber 102, and a second brake piston 112 is mounted within the second brake piston chamber 112. A first brake piston seal 114 surrounds the first brake piston 110 and prevents the leakage of fluid between the first brake piston 110 and the walls of the first brake piston chamber 102. Likewise, a second brake piston seal 115 surrounds the second brake piston 112 and prevents the leakage of fluid between the second brake piston 112 and the walls of the second brake piston chamber 104.

The components of the brake assembly which actually apply braking force to the disc 24 and the manner in which they are mounted will now be described in detail.

Figure 5:
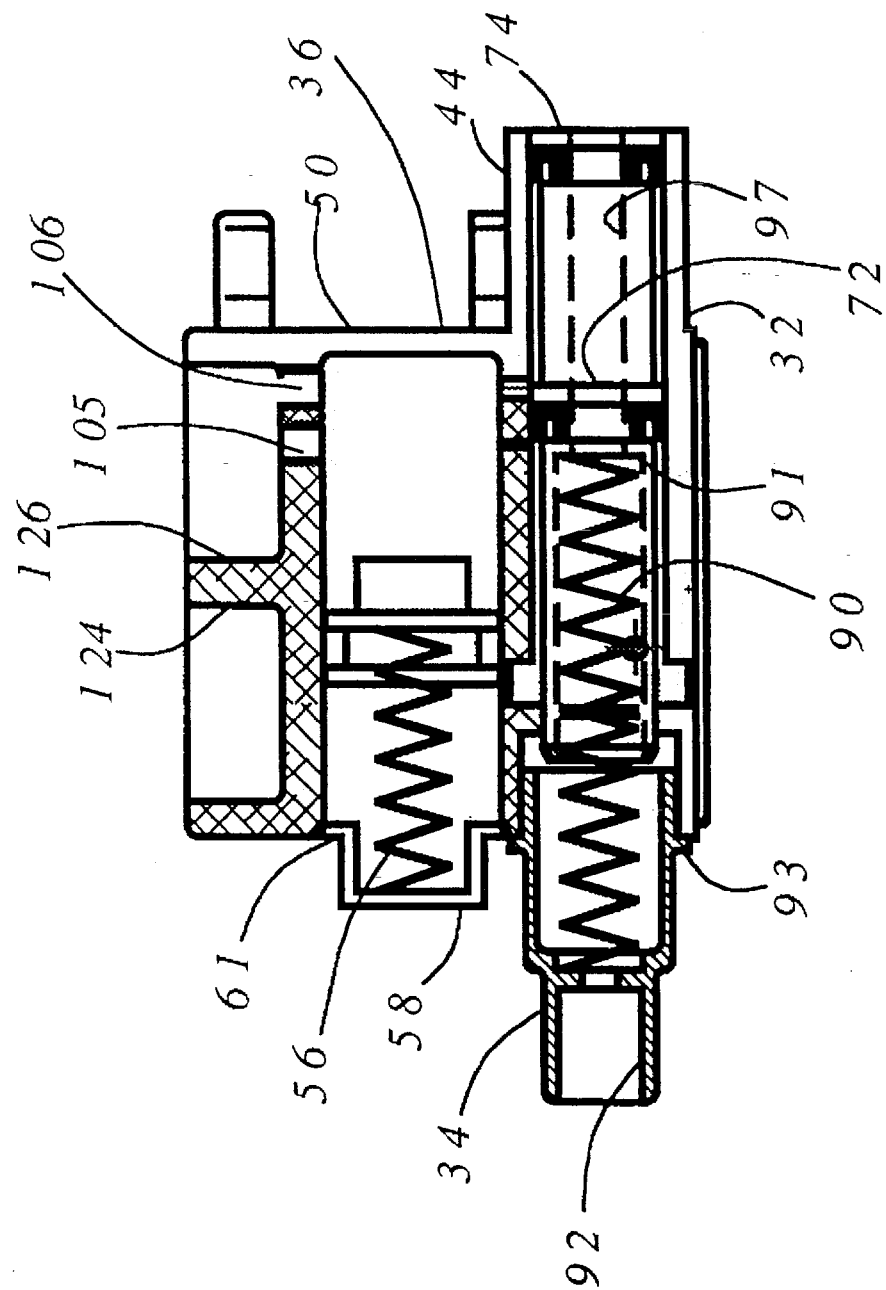
FIG. 5 is a cross-sectional view of a main unit of the disc braking assembly of FIG. 2 taken along lines 5—5 of FIG. 4.
Figure 9:
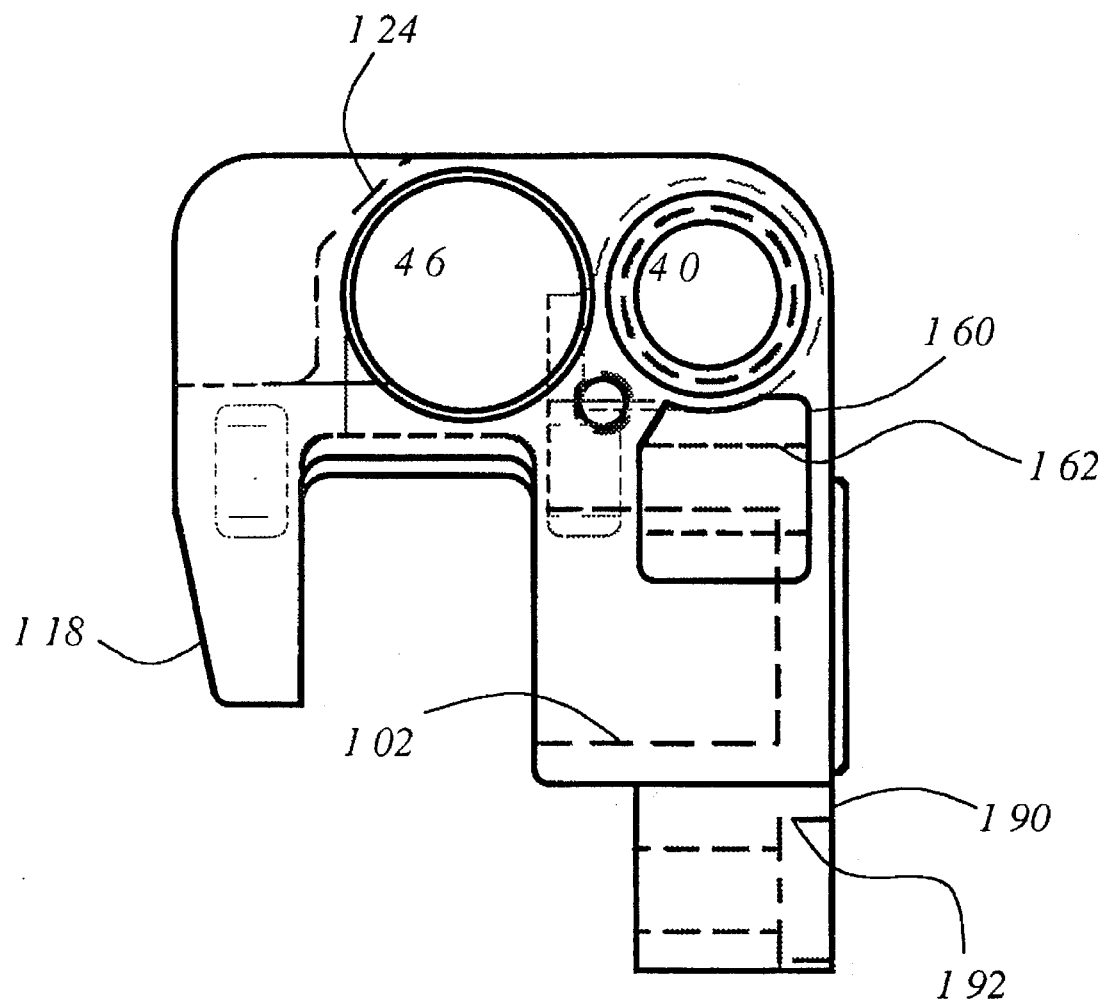
FIG. 9 is a left end elevational view of the main unit.
Figure 10:
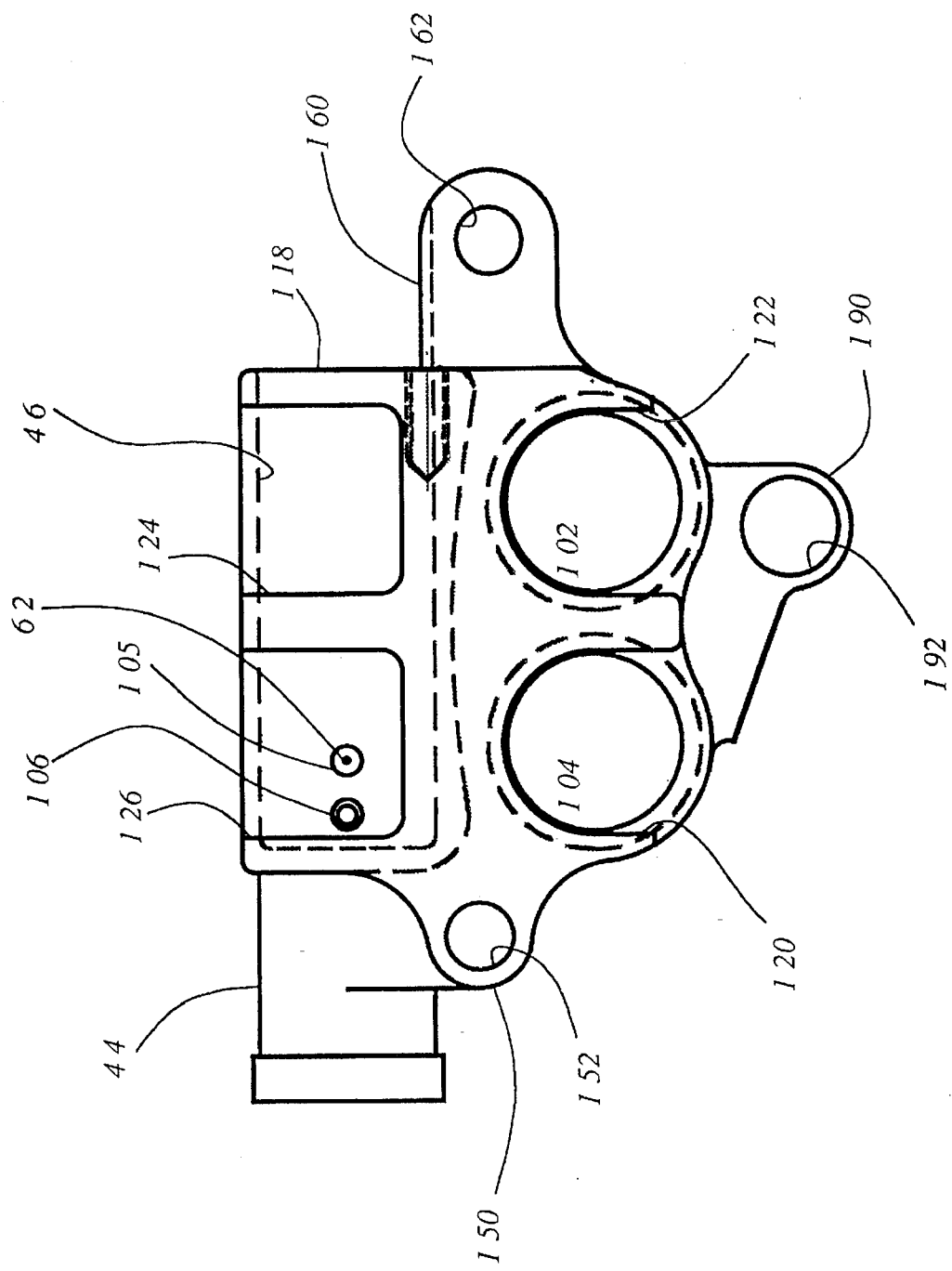
FIG. 10 is an elevational view of the inner side of the main unit.

Referring to FIGS. 9 and 10, the main unit 20 includes an L-shaped retaining flange 118 which defines a first upper U-shaped cut-out 120 and a second upper U-shaped cutout 122. While not critical to the operation of the brake assembly, these cutouts permit the first brake piston chamber 102 and second brake piston chamber 104 to be easily bored during manufacture. Additionally, the retaining flange 118 also forms a first rectangular detent 124 and a second rectangular detent 126. These detents have the dual purpose of lightening the main unit 20. Furthermore, as seen in FIGS. 5 and 10, the second detent 126 includes a first drill hole 105 and a second drill hole 106, which perform no function other than to provide a drill path to form the first compensating channel 62 and the second compensating channel 66, respectively.

Figure 6B:
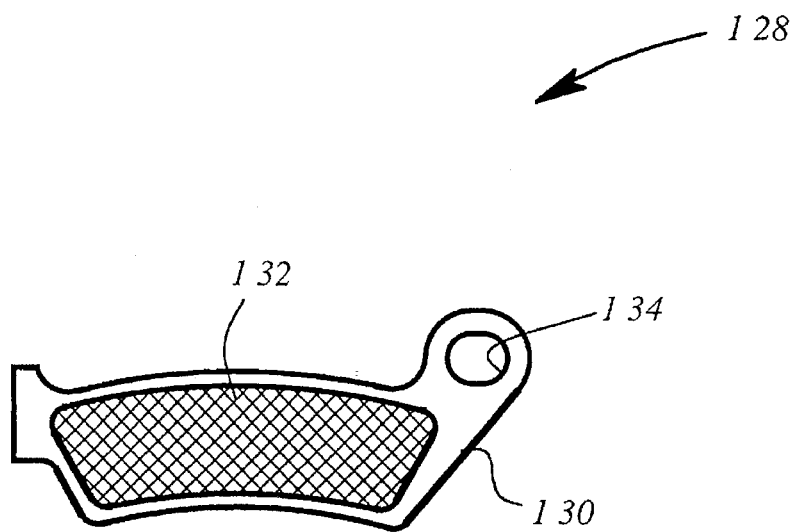
FIG. 6b is an elevational view of the outer brake shoe with the brake pad shown in phantom.
Figure 16:
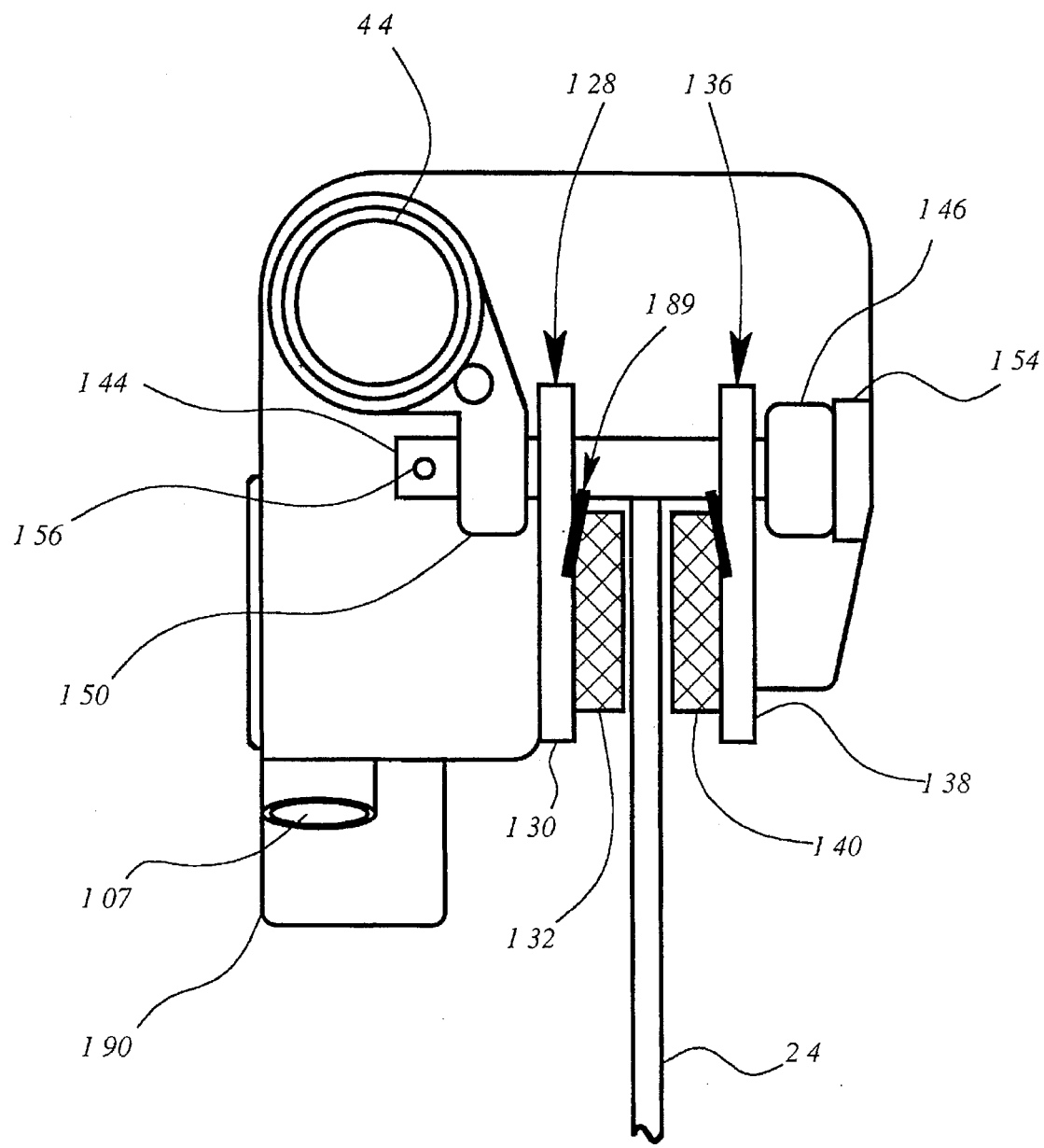
FIG. 16 is a rear elevation view of the main unit of FIG. 9.

Referring to FIGS. 3, 6, and 16 the main unit is provided with a first brake shoe 128 having a first generally tetrahedral-shaped backing plate 130 to which is secured a first tetrahedral-shaped brake pad 132. The backing plate 130 has an extension defining a first mount opening 134. The assembly further includes a second brake shoe 136 comprised of a second generally tetrahedral-shaped backing plate 138 to which a generally tetrahedral-shaped brake pad 140 is secured. The second backing plate 138 likewise has an extension in which a second mount opening 142 is provided.

A first guide rod 144 extends through the first mount opening 134 and second mount opening 142 of the first and second brake shoes 128 and 136. The rod 144 further extends through a first ear 146 formed on the brake piston housing 38 within a bore 148 formed therein. An axially aligned second ear 150 defining a coaxial second bore 152 is formed in the retaining flange 118, to the left as seen in FIG. 10. As seen in FIG. 3, the first guide rod 144 is secured in place by means of an enlarged head 154 which abuts the first ear 146 and a cotter pin (not shown) which extends through a mating bore 156 in the end of the first guide rod 144 proximate the second ear 150 of the retaining flange 118.

Figure 12B:
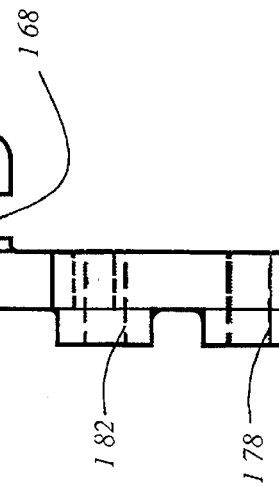
FIG. 12b is a rear elevational view of the bracket of FIG. 11.
Figure 12A:
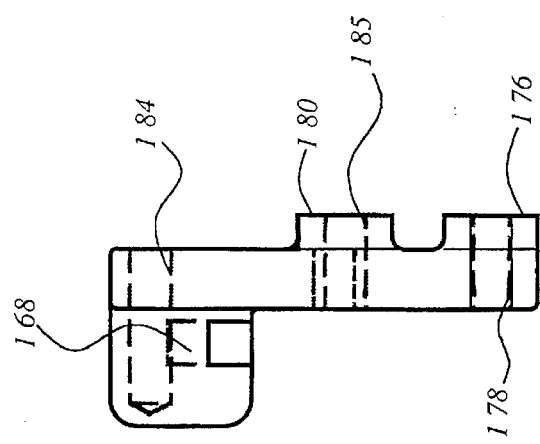
FIG. 12a is a front elevational view of the bracket of FIG. 11.
Figure 11:
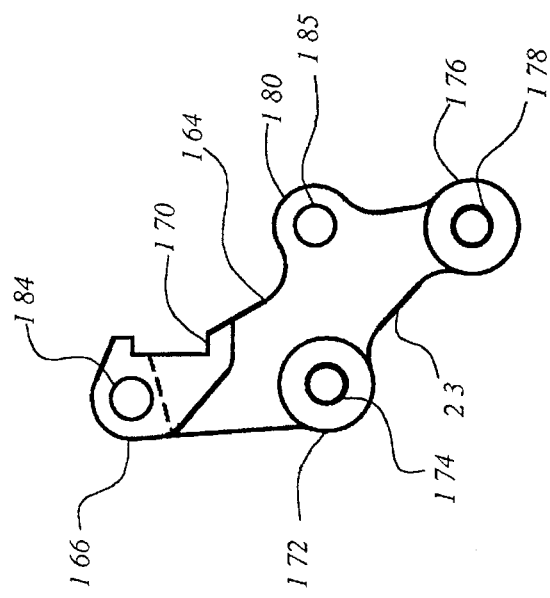
FIG. 11 is an elevational view of the outer side of the mounting bracket of the disc braking assembly of the present invention.

A second guide rod 158 extends in a third ear 160 extending from the right-hand side of the brake piston housing 38 as seen in FIG. 10. This third ear 160 defines a third bore 162 into which the second guide rod 158 is press fit. The mounting bracket 23 is mounted on the second guide rod 158. As best seen in FIGS. 11, 12, and 12b the mounting bracket 23 includes a body 164 and a generally L-shaped centering arm 166. The body 164 and the centering arm 166 cooperate to define a clearance slot 168 therebetween, within which is positioned the disc 24. Likewise, as seen in FIG. 11, the body 164 and centering arm 166 both include a rectangular cutout 170 which cooperate to define a guide track for the end of the brake shoes 128, 136 opposite the mount openings 134, 142.

The body 164 defines a first ear 172, positioned generally below the centering arm 166 as seen in FIG. 11, having a first opening 174, and a second ear 176 having a second opening 178 at the lower extremity of the body 164. The body 164 defines a third ear 180 to the right and above the second ear 176 which has a third opening 182. A fourth opening 184 extends through the top of the body 164 and slidably receives the second guide rod 158. A third guide rod 188 is press fit into the third opening 182 of the third ear 180 on one end and is received in a fourth ear 190 of the main unit 20 within a fourth bore 192 formed thereby. The third guide rod 188 is preferably provided with an enlarged head which cooperates with a seat within the fourth bore 192 of the main unit 20 to limit movement of the guide rod 188; this enlarged head may comprise a screw threadably engaged in end of the guide rod 188.

Figure 6C:
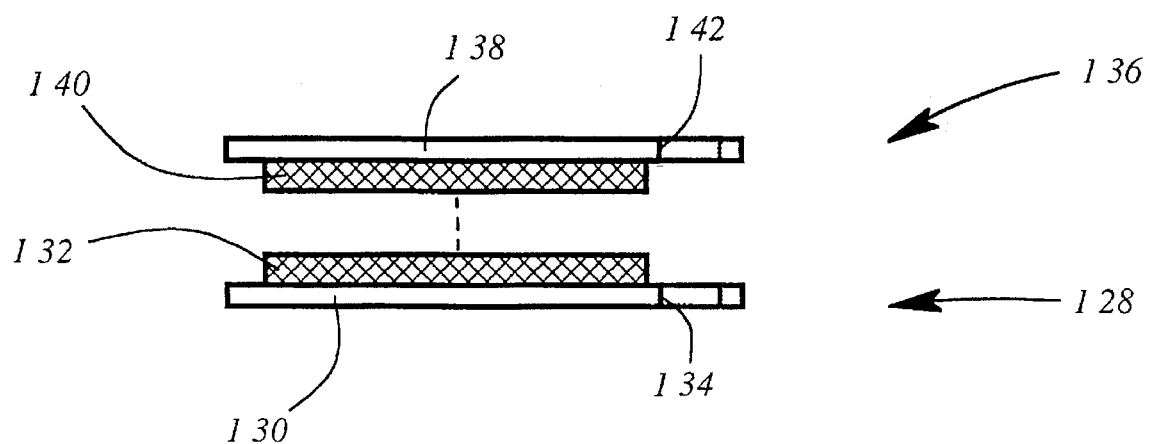
FIG. 6c is a top view of the pair of brake shoes.
Figure 13:
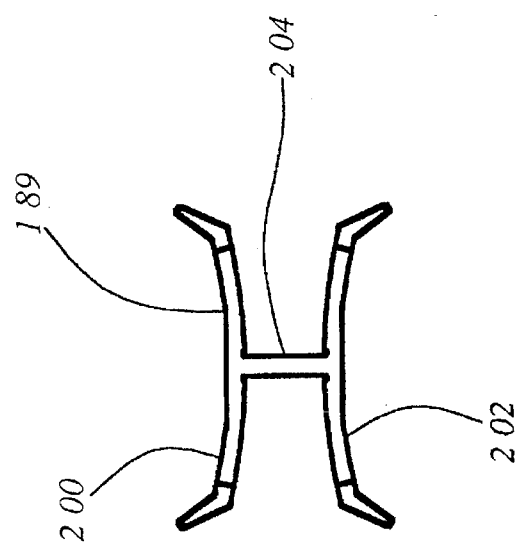
FIG. 13 is a top plan view of a return spring of the brake unit.

The first brake shoe 128 and the second brake shoe 136 are biased away from one another by a generally H-shaped return spring 189, seen in detail in FIGS. 6C and 13. The return spring 189 includes a first arm 200 having annular extensions on each end, a second arm 202 likewise including annular extensions on each end, and a connecting portion 204.

Referring now again to FIG. 1, a distal end of the cable 28 is desirably covered by a distal end cap 206 and the sheath collar 94 on the proximal end of the main unit 20 is desirably covered by a proximal end cap 208.

Figure 14:
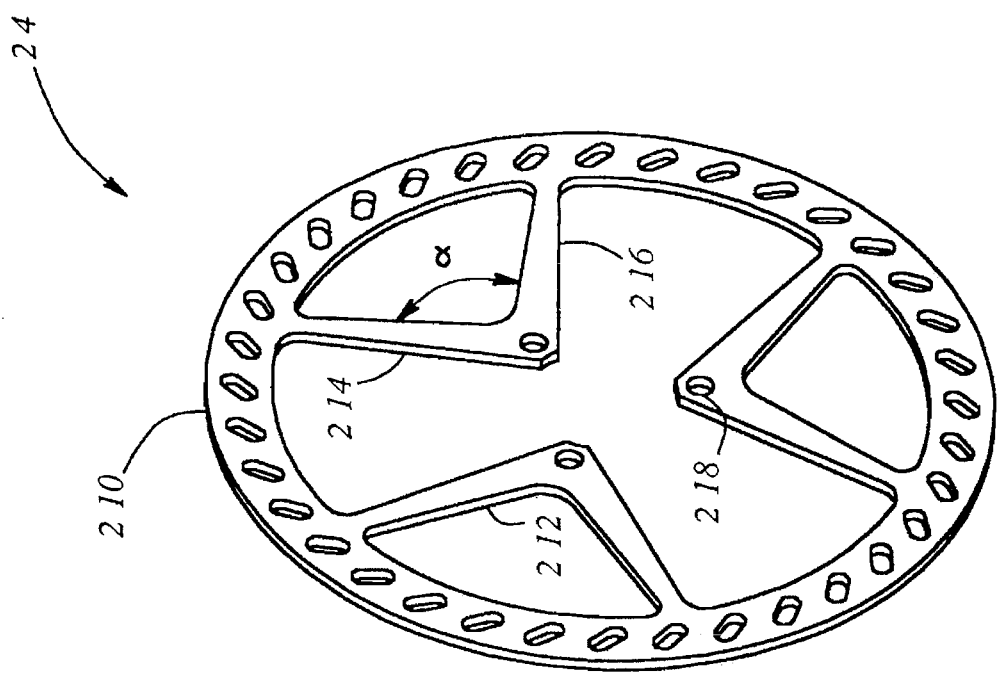
FIG. 14 is a perspective view of a brake disc of the bicycle of FIG. 1.

The disc 24 of the brake assembly will now be described with reference to FIGS. 1 and 14. The disc 24 desirably comprises a thin circular body 210 and three generally L-shaped mounting members 212. Each of the mounting members includes a first leg 214 and a second leg 216 which define an included angle α. At the junction between the first leg 214 and the second leg 216 there is provided a mounting hole 218 for receiving bolts 220 which secure the disc 24 to the wheel 16 of the bicycle 10. Advantageously, the disc 24 is stamped in a single piece from stainless steel which is then heat treated to RC 40 Hardness. Advantageously the included angle α between the first leg and the second leg is approximately 90°. The novel structural configuration of the disc has been found to substantially eliminate warping common to bicycle disc brake systems due to expansion and contraction of the relatively thin disc as a result of heat generated by braking during operation.

The general operation of the disc brake assembly of the present invention will now be described with reference to FIGS. 3 and 15. FIG. 3 illustrates the relaxed or release position of the brake assembly when no force is being applied by the brake shoes 128 and 136 to the disc 24. In this release position, the hydraulic fluid in the compensating chamber 54, the primary chamber 76, the secondary chamber 78 and the brake piston chambers 102, 104 are at equal pressures. The master piston shaft biasing member 90 biases the master piston shaft 70 to a nominal, neutral position during the release or non-braking riding conditions. In this position, the hydraulic fluid is able to flow between the first compensating channel 62 and the primary chamber 76, and between the second compensating channel 66 and the secondary chamber 78. The compensating piston biasing member 56 biases the compensating piston 52 so that the primary and secondary chambers 76, 78 are free of air bubble formation.

Figure 15:
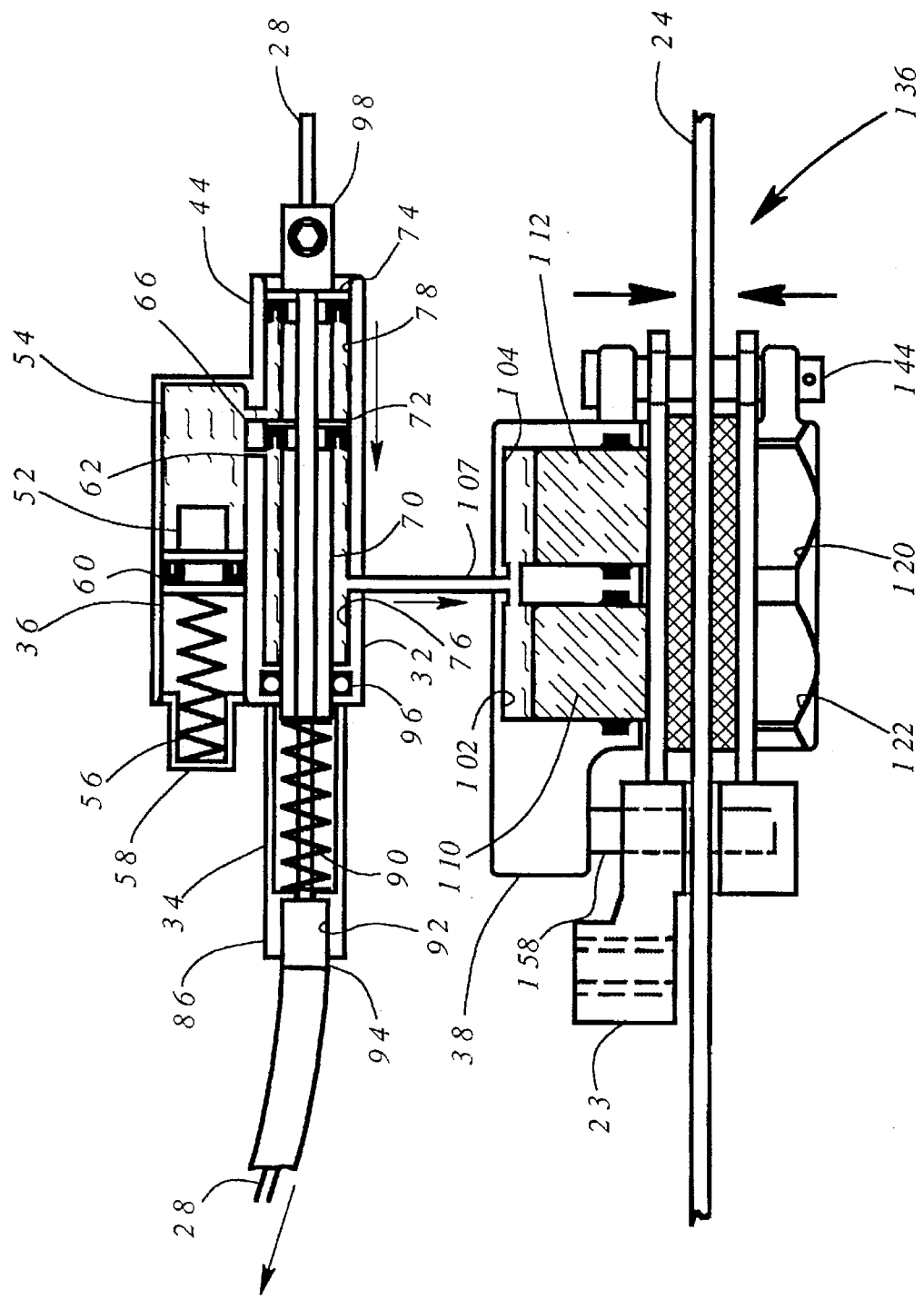
FIG. 15 is a schematic view of the hydraulic brake assembly shown in a braking position.

When the actuator 26 is depressed and pulls on the proximate end of the cable 28 thereby causing the distal end of the cable 28 to overcome the biasing force of the master shaft biasing member 90 and move the master piston shaft 70 away from the second end 44 of the master chamber 40 to the braking position, as shown in FIG. 15. In this position, the primary chamber 76 is completely cut off from the compensating chamber 54. The hydraulic fluid in the primary chamber 76 is forced through the brake channel 107 along the flow path 108 and equally into the brake piston chambers 102, 104. The brake shoe 128 is acted on by the brake pistons 110, 112 overcoming the biasing force of the H-shaped return spring 189 pressing the pad 132 against the disc 24. The counteracting force of the disc 24 on the brake pad 132 causes the entire main unit 20 to move relative the mounting bracket 23 along the second guide rod 158 and the third guide rod 188. As the brake pistons 110, 112 continue to exert increasing pressure on the disc, the main unit 20 continues to move relative the mounting bracket 23 until the second brake shoe 136 is also brought into contact with the disc 24. Thereafter, continued movement of the brake pistons results in both the first and second brake shoes 128, 136, exerting braking force on the disc 24.

In the braking position, the fluid in the compensating chamber 54 continues to be biased by the compensating piston biasing member 56 and flows through both compensating channels 62, 66 into the secondary chamber 78. The total volume of hydraulic fluid in the disc brake assembly is predetermined such that there is no braking pressure by the brake pistons 110, 112 on the disc 24 when the master piston shaft 70 is in the release position. Further, the master piston 72 is aligned in the master chamber 40 to allow fluid flow into the primary chamber 76 and the secondary chamber 78 in the release position. The maximum length of the cable displaced by full depression of the actuator 26 is limited such that, in the braking position, the travel of the master piston shaft 70 is limited so that the secondary piston 74 does not move beyond the second compensating channel 66, thereby preventing leakage from the second end 44 of the master housing 32.

In both the release and braking positions, unlike the previous disc brake systems, the compensating piston biasing member 56 helps prevent air from forming in the fluid in both the primary and secondary chambers 76, 78 by providing a sufficient pressure thereon. As the fluid heats and cools during the periods of use and disuse, the variations in the volume of the hydraulic fluid are accommodated by the compensating piston biasing member 56, displacing the compensating piston 52 accordingly.

In the preferred embodiment, the disc braking assembly of the present invention provides a main unit 20 of integral, one-piece construction. A preferred material of both the main unit 20 and the bracket 23 is aluminum; although, magnesium or any similar lightweight material of comparable strength and durability may be used. The overall size of the main unit of the present invention is such that an envelope of no larger than 2-¾" by 1-½" by 1-¾" inches is formed. The cut-outs 120, 122 and detents 124, 126 serve to further reduce the weight of the main unit 20. As stated previously, the reduction in weight of the bicycle 10 and all of its components, as well as a rugged and durable construction, is of great concern and priority to bicycle riders, and particularly to mountain bike riders.

The mounting to the fork arm 14 of the bicycle 10, rather than to the wheel 16, provides easier maintenance access. The wheel 16 is thus readily removed from the fork 12 for tire patching of a flat or other needed repair, without removal or disassembly of the present disc brake assembly. When the main unit 20 is desired to be removed from the fork 12, it is easily accomplished by the separation of the bracket 23 from the clamp 22.

The integral, one-piece construction of the main unit 20 and the minimal number of fasteners and other components results in a simplified manufacture of the disc brake assembly. This arrangement further facilitates the manufacture of a main unit smaller and less expensive than previously possible where the brake assembly was actuated by external lever arms secured to the main unit. The reduced number of components also results in a stronger assembly having fewer parts susceptible to breakage. Furthermore, the design eliminates the maintenance problems associated with the exposure of the levers and pivots being exposed to the environment.

In addition, the use of the compensating means by the present invention provides the bicycle rider with consistent feedback for a given amount of braking force during the course of a ride. The heating that occurs when prolonged braking is used on a downhill is accommodated by the present system via the compensating means as described herein. It is important that the rider knows how much pressure to apply to change the speed of the bicycle precisely the right amount when riding in steep and/or rugged terrain.

Importantly, the bicycle disc brake assembly provides this constant feed back without the risk of air bubble formation. Bicycles, unlike automobiles, are usually put into a variety of positions, including on their sides and upside down, during typical riding, transporting, storing and repairing of the bicycles and are therefore susceptible to air bubbles from these types of handling. Since the total amount of hydraulic fluid in the brake system and the size of the fluid pathways is quite small, even the smallest air bubble can cause brake failure and possible injury to the rider. The possibility of brake system failure from air bubble formation in the fluid chambers and pathways is greatly reduced by the present invention's use of the reservoir chamber and compensating means.

Thus, the disc brake assembly constructed in accordance with the present invention provides a lightweight and reliable main unit which minimizes the potential for brake system failure from the presence of air bubbles. The disc brake assembly also provides a consistent feedback to the rider of the braking pressure, giving a constant feel for a given level of brake pressure exerted on the disc and wheel. The disc brake assembly further provides easier maintenance by its durable, compact construction and also by its attachment to the bicycle fork.

The embodiments illustrated and described above are provided merely as examples of the disc brake assembly of the present invention. Other changes and modifications can be made from the embodiments presented herein by those skilled in the art without departure from the spirit and scope of the invention, as defined by the appended claims.

I claim:

1. A disc brake assembly for a bicycle, comprising:

a master housing defining a master chamber having a first end and a second end, said master housing adapted to be mounted on a fork of said bicycle;

a reservoir housing defining a reservoir chamber having a first end and a second end;

a compensating body mounted within said reservoir chamber, said compensating body and said reservoir chamber cooperating to form a compensating chamber;

a compensating biasing member distal said compensating body from said second end of said reservoir chamber, said compensating biasing member biasing said compensating body toward said second end of said reservoir chamber;

a first compensating channel defining a first compensating flow path connecting said master chamber and said compensating chamber;

a master piston shaft, said master piston shaft mounted at least partially within said master chamber;

a master piston mounted on said master piston shaft defining a primary chamber between said master piston and said first end of said master chamber;

a seal between said master piston shaft and said master housing, said seal at least partially defining a secondary chamber between said master piston and said second end of said master chamber;

a brake piston housing defining a brake piston chamber;

a brake channel defining a brake flow path connecting said primary chamber with said brake piston chamber;

a brake piston reciprocally mounted within said brake piston chamber, wherein said master piston shaft is movable from a braking position wherein said first flow path is in communication with said secondary chamber and a release position wherein said first flow path is in communication with said primary chamber.

2. The assembly of claim 1, wherein said compensating biasing member has a spring constant of between two and four pounds per inch.

3. The assembly of claim 1, further comprising hydraulic fluid in said chambers and channels, said compensating biasing member exerting sufficient force on said compensating body that said compensating body exerts at least 0.3 pounds per square inch on said hydraulic fluid in said compensating chamber.

4. The assembly of claim 3, wherein said compensating body exerts between 0.5 and 3 pounds per square inch on said hydraulic fluid in said compensating chamber.

5. The assembly of claim 4, further comprising a second compensating channel defining a second compensating flow path connecting said master chamber and said compensating chamber.

6. The assembly of claim 5, further comprising a brake pad connected to one of said housings.

7. The assembly of claim 6, wherein said master housing, said reservoir housing and said piston housing comprise a one-piece unit.

8. The assembly of claim 6, further comprising:

a guide rod connected to one of said housings; and a mounting bracket adapted to be fixed relative to a bicycle fork defining an opening slidably receiving said guide rod.

9. The assembly of claim 1, further comprising a second compensating channel defining a second compensating flow path connecting said master chamber and said compensating chamber.

10. The assembly of claim 9, wherein said seal comprises a secondary piston connected to said master piston shaft.

11. The assembly of claim 9, wherein said master piston shaft is generally coaxially connected to a cable.

12. The assembly of claim 11, further comprising:
a guide rod connected to one of said housings; and
a mounting bracket adapted to be fixed relative to a bicycle fork defining an opening slidably receiving said guide rod.

13. A disc brake assembly for a bicycle comprising:
a master housing defining a master chamber having a first end and a second end, said master cylinder adapted to be mounted on a fork of said bicycle;
a reservoir housing defining a compensating chamber;
a first compensating channel connecting said master chamber and said compensating chamber;
a second compensating chamber connecting said master chamber and said compensating chamber;
a master piston shaft defining an internal path, said master piston shaft mounted at least partially within said master chamber;
a master piston mounted on said master piston shaft defining a primary chamber between said master piston and said first end of said master chamber;
a secondary piston mounted on said master piston shaft, said secondary piston at least partially defining a secondary chamber between said master piston and said secondary piston;
a master piston shaft biasing member receptacle connected to said master chamber;
a master piston shaft biasing member mounted within said master piston shaft biasing member receptacle biasing said master piston shaft from a braking position wherein said first channel and said second channel are in communication with said secondary chamber toward a release position wherein said first channel is in communication with said primary chamber and said second channel is in communication with said secondary chamber;
a cable extending through said internal path adapted to be connected to an actuator handle of said bicycle;
a brake piston housing defining a brake piston chamber;
a brake channel connecting said primary chamber with said brake piston chamber;
a brake piston reciprocally mounted within said brake piston chamber.

14. The brake assembly of claim 13, further comprising:
a first brake pad secured to one of said housings; and
a second brake pad secured to one of said housings, said first and said second brake pads adapted to straddle a disc mounted on a wheel of said bicycle.

15. The brake assembly of claim 13, further comprising a compensating body and a compensating body biasing member distal said compensating body from said first compensating channel.

16. The brake assembly of claim 13, wherein said master housing, said reservoir housing and said brake piston housing comprise a one-piece integrally formed unit.

17. The brake assembly of claim 16, further comprising a compensating body and a compensating body biasing member distal said compensating body from said first compensating channel.

18. The assembly of claim 17, further comprising hydraulic fluid in said chambers and channels, said compensating body biasing member exerting sufficient force on said compensating body that said compensating body exerts at least 0.3 pounds per square inch on said hydraulic fluid in said compensating chamber.

19. The brake assembly of claim 16, further comprising:
a guide rod connected to one of said housings; and
a mounting bracket adapted to be fixed relative to a bicycle fork defining an opening for slidably receiving said guide rod.

20. The assembly of claim 19, further comprising hydraulic fluid in said chambers and channels, said compensating piston biasing member exerting sufficient force on said compensating piston that said compensating piston exerts at least 0.3 pounds per square inch on said hydraulic fluid in said compensating chamber.

21. A disc brake assembly for a bicycle, comprising:
a bicycle wheel having an axle;
a disc mounted on said wheel proximate said axle;
a bicycle fork having a pair of arms straddling said wheel;
an actuator handle;
a master housing defining a master chamber having a first end and a second end, said master housing secured to said fork;
a reservoir housing defining a reservoir chamber;
a first compensating channel connecting said master chamber and said compensating chamber;
a second compensating channel connecting said master chamber and said compensating chamber;
a compensating piston within said reservoir chamber;
a compensating piston biasing member distal said compensating piston from said first compensating channel;
a master piston shaft defining an internal path, said master piston shaft mounted at least partially within said master chamber;
a master piston mounted on said master piston shaft defining a primary chamber between said master piston and said first end of said master chamber;
a secondary piston mounted on said master piston shaft, said secondary piston at least partially defining a secondary chamber between said master piston and said secondary piston;
a master piston shaft biasing member receptacle connected to said master cylinder;
a master piston shaft biasing member mounted within said master piston shaft biasing member receptacle biasing said master piston shaft from a braking position wherein said first channel and said second channel are in communication with said secondary chamber and a release position wherein said first channel is in communication with said primary chamber and said second channel is in communication with said secondary chamber;
a cable extending through said internal path connected to said actuator handle;
a stop connected to said cable distal said master piston from said secondary piston;
a brake piston housing defining a first brake piston chamber and a second brake piston chamber;

a brake channel defining a brake flow path connecting said primary chamber with at least one of said brake piston chambers;

a first brake piston reciprocally mounted within said first brake piston chamber;

a second brake piston reciprocally mounted within said second brake piston chamber;

a first guide rod secured to one of said housings;

a first brake pad mounted on said first guide rod;

a second brake pad mounted on said first guide rod, said first and said second brake pads straddling said disc.

22. The assembly of claim 21, further comprising a second guide rod connected to one of said housings, and a mounting bracket secured to said fork defining an opening for slidably receiving said second guide rod, whereby said master housing is secured to said fork in a slidable relationship.

* * * * *